United States Patent
Smith et al.

(10) Patent No.: US 9,874,348 B2
(45) Date of Patent: Jan. 23, 2018

(54) WIND RESISTANT HEATER

(75) Inventors: Scott Smith, North Ryde (AU); Mark Michalowsky, Vauclause (AU)

(73) Assignee: Bromic Heating Pty. Limited (AU)

( * ) Notice: Subject to any disclaimer, the term of this patent is extended or adjusted under 35 U.S.C. 154(b) by 178 days.

(21) Appl. No.: 13/578,989

(22) PCT Filed: Feb. 25, 2011

(86) PCT No.: PCT/AU2011/000204
§ 371 (c)(1),
(2), (4) Date: Sep. 17, 2012

(87) PCT Pub. No.: WO2011/106824
PCT Pub. Date: Sep. 9, 2011

(65) Prior Publication Data
US 2013/0008434 A1    Jan. 10, 2013

(30) Foreign Application Priority Data
Mar. 3, 2010  (AU) ................................ 2010900896

(51) Int. Cl.
*F23D 14/12* (2006.01)
*F24C 3/04* (2006.01)
(Continued)

(52) U.S. Cl.
CPC ......... *F23D 14/145* (2013.01); *F23D 14/725* (2013.01); *F23D 14/76* (2013.01);
(Continued)

(58) Field of Classification Search
CPC .............. F23D 14/725; F23D 2208/10; F23D 2900/14125; F23D 14/145; F23D 14/76; F24C 15/24; F23N 5/12; F23N 2029/16
(Continued)

(56) References Cited

U.S. PATENT DOCUMENTS 4,752,213 A * 6/1988 Grochowski et al. ........ 431/328
5,099,822 A   3/1992 Cramer et al.
(Continued)

FOREIGN PATENT DOCUMENTS

CH         686096 A5 * 12/1995
DE    195 02 900 A1    8/1996
(Continued)

OTHER PUBLICATIONS

International Search Report, for PCT/AU2010/000204, dated Jun. 6, 2011, four (4) pages.
(Continued)

*Primary Examiner* — Alissa Tompkins
*Assistant Examiner* — Benjamin W Johnson
(74) *Attorney, Agent, or Firm* — Ware, Fressola, Maguire & Barber LLP (57) ABSTRACT

A radiant gas heater includes one or more gas inlets 105, for receiving gas from a gas supply and one or more air inlets 110. The heater includes gas burners 120A-120E, in which the gas is burned using oxygen admitted through the air inlets 110. One or more heat emitting elements 125A-125E are included, which emit infrared radiation using energy generated by the gas burners. One or more ionization probes 130A are provided proximal to two or more of the heat emitting elements for detecting the presence or absence of a flame. A housing 115 accommodates the gas burners, the heat emitting elements and the ionization probes. One or more control units are provided which are in electrical communication with the ionization probes and the gas inlets, the control units operable to shut off the gas supply if the ionization probes detect the absence of a flame.

15 Claims, 5 Drawing Sheets

(51) Int. Cl.
  *F23D 14/14*  (2006.01)
  *F23D 14/72*  (2006.01)
  *F23D 14/76*  (2006.01)
  *F23N 5/12*  (2006.01)

(52) U.S. Cl.
  CPC ............ *F23N 5/12* (2013.01); *F23D 2207/00* (2013.01); *F23D 2208/10* (2013.01); *F23D 2209/20* (2013.01); *F23D 2900/00017* (2013.01); *F23N 2029/16* (2013.01); *F23N 2031/06* (2013.01); *Y02T 50/677* (2013.01)

(58) Field of Classification Search
  USPC .................................. 126/92 AC, 92 C, 91 R
  See application file for complete search history.

(56) References Cited

U.S. PATENT DOCUMENTS

| | | | | |
|---|---|---|---|---|
| 5,899,686 | A | * | 5/1999 | Carbone et al. .............. 431/328 |
| 5,919,039 | A | * | 7/1999 | Shaw et al. ................... 432/121 |
| 6,033,211 | A | * | 3/2000 | Meyer ........................... 431/329 |
| 6,114,666 | A | * | 9/2000 | Best ............................... 219/411 |
| 2002/0160325 | A1 | * | 10/2002 | Deng ............................... 431/76 |
| 2005/0229709 | A1 | * | 10/2005 | Lopushansky et al. ........ 73/708 |
| 2008/0142531 | A1 | | 6/2008 | Saunders et al. |
| 2009/0024194 | A1 | | 10/2009 | Schwank et al. |

FOREIGN PATENT DOCUMENTS

| | | |
|---|---|---|
| JP | S59-158839 U | 10/1984 |
| JP | S62 178815 A | 8/1987 |
| JP | H10 148331 A | 6/1998 |
| WO | EP1422475 A | 5/2004 |
| WO | WO2008/142531 A | 11/2008 |

OTHER PUBLICATIONS

European Supplemental Search Report for corresponding application No. EP 11 75 0071, dated Nov. 4, 2014, 7 pages.
European Supplemental Search Report for corresponding application EP 11 75 0071, transmittal dated Nov. 12, 2014, 7 pages.

* cited by examiner

WIND RESISTANT HEATER

CROSS-REFERENCE TO RELATED APPLICATIONS

This application is a national stage application based on PCT International Application no. PCT/AU2011/000204, filed Feb. 25, 2011, which claims priority from Australian Patent application no. 2010900896, filed Mar. 3, 2010, the contents of which are hereby incorporated by reference.

FIELD OF THE INVENTION

The present invention relates to a radiant gas heater and more particularly to an outdoor radiant gas heater which is operable in windy conditions.

BACKGROUND OF THE INVENTION

Changes in consumer tastes and regulations (i.e. anti-smoking) have resulted in larger usage of outdoor areas both commercially and domestically for eating and entertaining. As a result, the use of radiant gas or outdoor type heaters has increased.

Radiant gas heaters offer an effective source of radiant heat which is essential for outdoor applications. Radiant gas heaters having ceramic tiles are particularly effective. However a problem with this type of heater is that it does not function well in windy conditions since it requires consistent air flow at low speed to function and burn correctly. Wind turbulence will cause the burner to fail.

In an attempt to alleviate this problem, electronically controlled gas valves are used which enable the heater to be shut down in the event of flame failure and operated without manually lighting, re-lighting and extinguishing the burners.

Electronically controlled gas valves typically have a thermocouple and pilot burner arrangement. The thermocouple is used for sensing the presence of a flame and works together with the pilot burner (distant from the main burner so as to be isolated from wind). The pilot burner is typically in an enclosure so as to maintain a constant flame.

A problem with this arrangement is that using a pilot burner to keep the main burner alight in wind is unreliable since the main burner will still extinguish and must re-light from the pilot burner each time it blows out. Inconsistency therefore results as gas control lock out can occur before re-lighting. In the event of a lock out, a full manual re-set is required which may require power to be disconnected and reconnected.

Use of pilot burners can be avoided by using an ionization detector. An ionization detector may be provided directly on the main burner and can provide quicker lighting and quicker shut down in the event of flame failure. However, a problem with ionization detectors is that they are only suited to indoor applications. Ionization detector arrangements are unsuitable for outdoor applications since the rapid response of the ionization detector prevents their usage on a burner exposed to windy conditions. This arrangement has not been possible in outdoor applications as wind is unavoidable and usage of an ionization system results in the problem of continuous burner "blow out" (failure).

It would therefore be desirable to provide an improved radiant gas heater which alleviates or at least ameliorates the above disadvantages.

It will be appreciated that a reference herein to any matter which is given as prior art is not to be taken as an admission that that matter was, in Australia or elsewhere, known or that the information it contains was part of the common general knowledge as at the priority date of the claims forming part of this specification.

SUMMARY OF THE INVENTION

With this in mind, one aspect of the present invention provides a radiant gas heater including: one or more gas inlets, for receiving gas from a gas supply; one or more air inlets; one or more gas burners, in which gas from the one or more gas inlets is burned using oxygen admitted through the one or more air inlets; one or more heat emitting elements, which emit infrared radiation using energy generated by the one or more gas burners; one or more ionization probes proximal to two or more of the heat emitting elements for detecting the presence or absence of a flame; a housing, which accommodates the one or more gas burners, the one or more heat emitting elements and the one or more ionization probes; one or more control units in electrical communication with the ionization probes and the one or more gas inlets, the control unit operable to shut off the gas supply if the one or more ionization probes detect the absence of a flame.

Advantageously, the use of at least one (or more) ionization probes allows one or more heat emitting elements to extinguish, but provided that the ionization probes is still sensing a flame at one of the heat emitting elements, the gas supply will not be shut off. Advantageously, this results in the radiant gas heater remaining in operation even in windy conditions while maintaining safety. In a further advantage, the use of only one ionization probe across two or more heat emitting elements reduces the cost while still avoiding the gas supply being shut off unnecessarily.

Preferably, the one or more ionization probes extend across the length of two or more of the heat emitting elements.

In an alternative, two or more ionization probes may be proximal to one or more heat emitting elements for detecting the absence of a flame.

Advantageously, the use of two or more ionization probes allows one or more burners to extinguish, but provided that at least one of the ionization probes is still sensing a flame, the gas supply will not be shut off. Advantageously, this results in the radiant gas heater remaining in operation even in windy conditions while maintaining safety.

The two or more ionization probes may extend across the length of a heat emitting element.

Preferably, the two or more ionization probes extend across the length of two or more of the heat emitting elements.

Preferably, the one or more control units are operable to maintain the gas supply if the one or more ionization probes detect the presence of a flame on at least one of the heat emitting elements.

Advantageously, since the one or more ionization probes can sense if there is a flame present or not at any point across the ionization probe (which may be across a single heat emitting element or across multiple heat emitting elements) this allows the radiant gas heater to be kept on even in the absence of a flame on one or more (but not all) burners. The flame must be strong enough to generate an ionization level sufficient to meet the minimum current requirements in the control unit. Advantageously, this arrangement prevents blow out due to cold spots which can occur around specific segments of the heat emitting elements due to turbulent wind. In a further advantage, the use of multiple ionization probes (or a single ionization probe across multiple heat emitting elements) picks up the presence of a flame across a point along the heat emitting elements (provided the flame is strong enough). Constant gas flow through the heat emitting elements will then ensure that cross lighting continues to occur, thus avoiding total blow out.

Preferably, the one or more control units are operable to shut off the gas supply if the one or more ionization probes detect the absence of a flame on each of the two or more heat emitting elements. Advantageously, if there is a total blow out (i.e. all burners have blown out) the control unit shuts down the gas supply.

The heat emitting elements may be selected from a group including ceramic tiles, compressed metal mesh or metal foam.

Preferably, one or more spacer elements are positioned between the one or more ionization probes and the one or more heat emitting elements.

Advantageously, the spacer elements position the ionization probes so that they are protected from too much heat and at the same time secure the position of the ionization probes and the distance of the ionization probes from the heat emitting elements.

Preferably, the one or more spacer elements are made of a non-conducting material such as ceramics.

Preferably, the two or more ionization probes further include a mount attached to one end of the ionization probe for mounting to the control unit.

Advantageously, the mount prevents the ionization probes from being earthed over an extended period of use of the radiant gas heater.

Preferably, the mount is made of a non-conducting material such as ceramics.

Preferably, the radiant gas heater further includes a cover attachable to the housing, wherein the cover is formed from ceramic glass. Advantageously, the cover acts to further protect the radiant gas heater from being susceptible to wind.

In an alternative, the radiant gas heater includes a cover attachable to the housing, the cover including a plurality of apertures through which infrared radiation is directed.

Advantageously, the cover acts to further protect the radiant gas heater from being susceptible to wind but with less material than a full cover which reduces manufacturing costs.

Preferably, the cover is formed from a material which is capable of withstanding high temperatures and substantially transparent to infrared radiation.

Preferably, the combined surface area of the plurality of apertures is between 45 to 55% of the total surface area of the cover.

More preferably, the combined surface area of the plurality of apertures is 49 to 51% of the total surface area of the cover.

Advantageously, the apertures may allow heat flow but also act to prevent wind from blowing out the burners. The above surface area of the apertures compared with the total surface area of the cover provides a balance between heat flow and wind resistance.

The following description refers in more detail to the various features and steps of the present invention. To facilitate an understanding of the invention, reference is made in the description to the accompanying drawings where the invention is illustrated in a preferred embodiment. It is to be understood however that the invention is not limited to the preferred embodiment illustrated in the drawings.

BRIEF DESCRIPTION OF THE DRAWINGS

In the drawings:
FIG. 1b is a front view of a radiant gas heater of FIG. 1a.

DETAILED DESCRIPTION OF EMBODIMENTS OF THE INVENTION

Figure 1A:
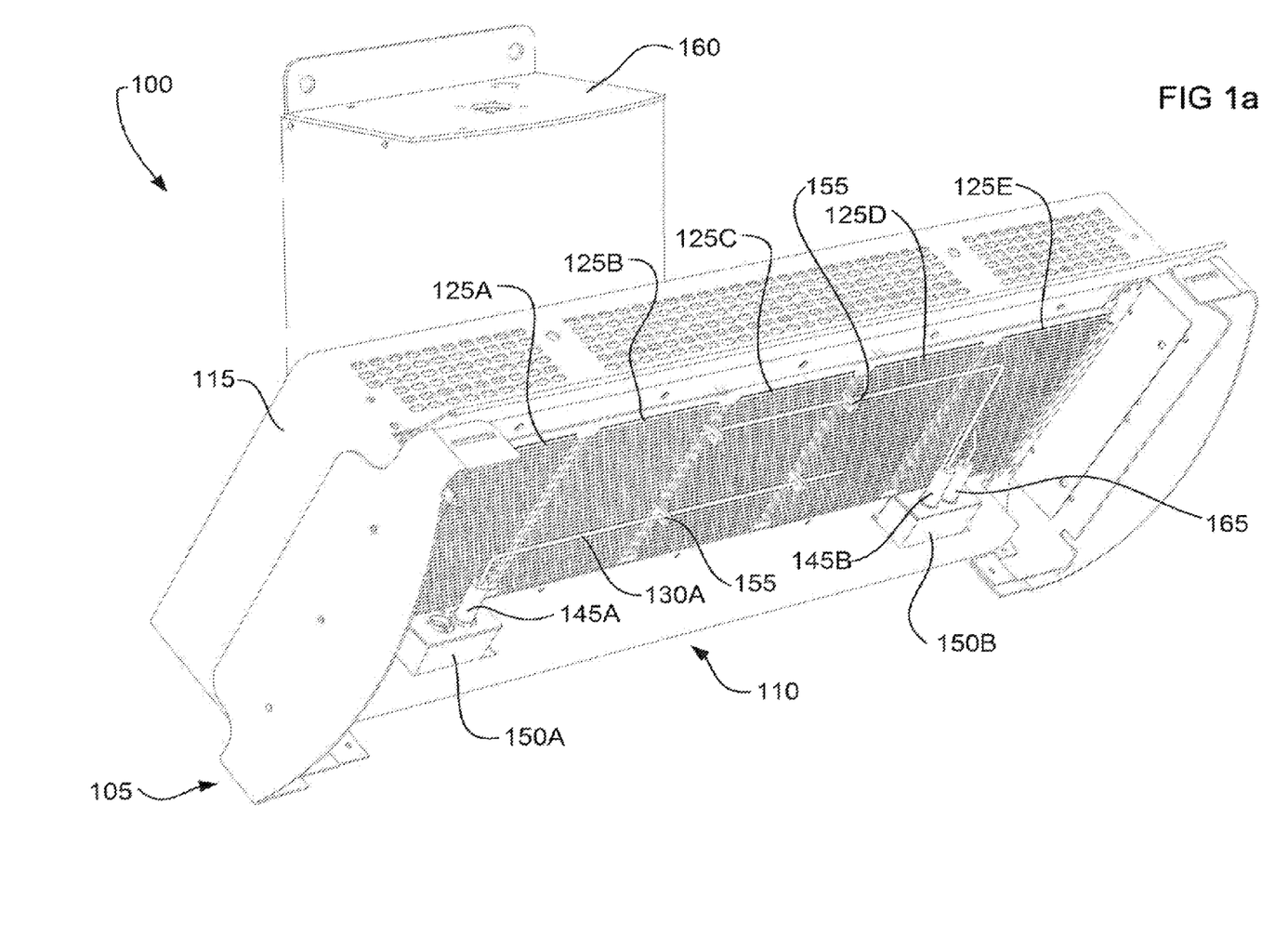
FIG. 1a is a perspective view of a radiant gas heater in accordance with an embodiment of the invention.
Figure 1B:
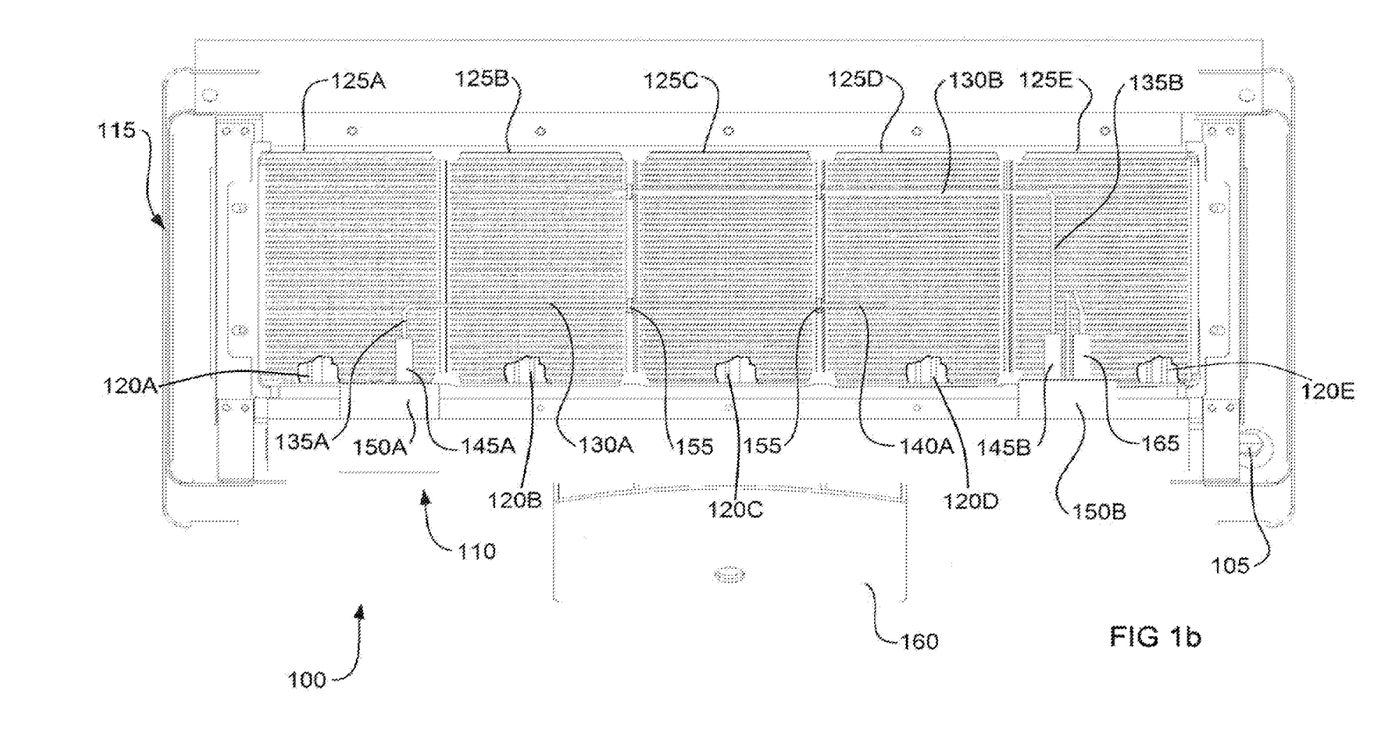

The radiant gas heater 100 illustrated in FIG. 1 includes a gas inlet 105 for receiving gas from a gas supply (not shown), a plurality of air inlets 110 are included in the underside of the housing 115 of the radiant gas heater 100 allowing air to enter and waste gases to escape. The housing 115 also includes a plurality of gas burners 120A-E in which gas from the gas inlet 105 is burned using oxygen in air admitted through the air inlets 110. Waste gases leave the housing 115 through the same air inlets 110 or alternatively separate exhaust outlets (not shown). It will be appreciated that any number of gas burners may be associated with the radiant gas heater 100. A mounting bracket 160 is attached to the housing 115 for attaching the gas heater 100 to a surface.

The radiant gas heater 100 further includes heat emitting elements 125A-125E each of which sit in front of gas burners 120A-120E. It will be appreciated that there may be one gas burner for each heat emitting element or there may be one gas burner for every two heat emitting elements. The heat emitting elements 125A-125E emit infrared radiation using energy generated by burning gas via the gas burners 120A-120E thereby heating the heat emitting elements. Heat is then directed away from the heat emitting elements 125A-125E and through a cover (shown in FIG. 2) to provide heat to the outdoor area. Heat emitting elements are preferably ceramic tiles, but may be made from any other suitable material (such as compressed metal mesh or metal foam). In an alternative embodiment, there may be more than one housing 115 which accommodates the gas burners 120A-E and heat emitting elements 125A-E such that one housing accommodates the gas burners and another housing accommodates the heat emitting elements and so on. The radiant gas heater 100 includes an ignition 165 for lighting or relighting the gas burners 120A-120E and further includes two ionization probes 130A, 130B having respective first ends 135A and 135B and second ends 140A and 140B. Ionization probes 130A, 130B are positioned proximal to the heat emitting elements 125A-125E. The first ends 135A and 135B of the ionization probes 130A and 130B include mounts 145A and 145B which are attached to a control unit 150A and 150B mounted on the housing 115. The mounts 145A and 145B are used in order to prevent the ionization probes from being earthed over an extended period of use of the radiant gas heater 100. Since the ionization probe is a true electrical conductor (a wire in its simplest form), over time, through exposure to heat and the external environment, the surface of the wire will oxidize and therefore build up an insulating layer. The electrical signal will find the quickest path to earth and unless mounts 145A and 145B are used, it will run to earth and the signal will be lost (causing the flame to be extinguished since the ionization circuit is earthed—for safety reasons) This situation will occur if the mounts are metal or even if ceramic rings are used which are held in by metal holders (in between the burners). The ionization probes 130A, 130B are secured at the first ends 135A and 135B by the mounts 145A and 145B and also secured to the heat emitting elements 125A-125E via spacer elements 155. The spacer elements 155 are preferably located at the second ends 140A and 140B of the ionization probes 130A, 130B and at points in between the first and second end of the ionization probes. Preferably, the spacer elements 155 space the ionization probes 3-4 mm away from the heat emitting elements 120A-E. The spacer elements 155 are preferably of a non-conductive material such as ceramics.

The control units 150A and 150B are in electronic communication with the gas inlet and gas valve (not shown) in order to control supply of the gas to the burners 120A-120E. In operation, the ionization probes 130A and 130B are positioned proximal to one or more of the heat emitting elements 125A-125E. The ionization probes 130A and 130B provide rapid response times in detecting the absence of flame and therefore ensure quicker lighting and quicker shut down in the event of flame failure. Flame failure is typically due to windy conditions which blow out the one or more burners. The operation of the ionization probes will not be described in great detail, since it will be apparent to those skilled in the art. The ionization probes work on the principle that a small current is applied between the ionization probe and earth and the flame creates an ionized path between the ionization probe and earth. In the event that the flame is in an unstable condition (such as flapping due to windy conditions), the ionized path is disturbed which causes interference in the current signal. A control unit will then shut down the gas supply and after a short time, attempt to restart the system. Since ionization ionisation probes work on the principle that micro current is applied between the rod and ground, the flame acts as an ionization path, and therefore the heater will shut down almost instantly (micro-seconds) in the event both sensors sense the absence of flame.

In the present invention, the provision of two or more ionization probes which extend along the heat emitting elements 125A-125E ensures a consistent and continuous signal sensed by the ionization probes over a larger area of the heat emitting elements 125A-125E. In this way, if heat emitting elements 125A and 125B are being affected by wind which is coming from left to right, the ionization probe 130A may detect an unstable condition and wish to shut down the burners 120A-E via the control unit 150A. However, it may be that heat emitting elements 125 C, D and E have not been extinguished or are not in an unstable condition. This is determined by the ionization probe 130B. If ionization probe 130B determines that there is no unstable condition, then the burners 120A-E will not be shut down, since even if burner 120A and/or 120B associated with heat emitting element 125A, 125B are extinguished and leaking gas, the heat emitting elements 125 C, D and E will be able to safely re-light heat emitting element 125B and 125A after a short period of time (due to their proximity). Advantageously, this results in the radiant gas heater 100 remaining in operation even in windy conditions while maintaining safety.

In the event that ionization probes 130A and 130B both detect that the burners 120A-E are off, then the control unit 150A, 150B shuts off the gas supply.

It will be appreciated that two or more ionization probes can be positioned in any arrangement extending across the surface area of one or more of the heat emitting elements 125A-125E. This is shown in FIG. 3A-3F.

Figure 3A:
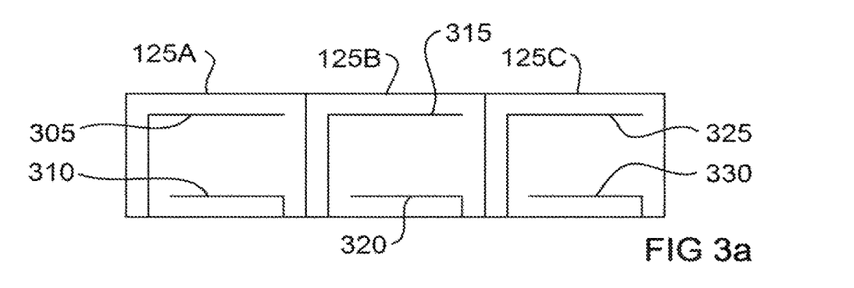
FIGS. 3A to 3G are schematic diagrams of the arrangement of ionization probes of the radiant gas heater of FIGS. 1a and b.
Figure 3B:
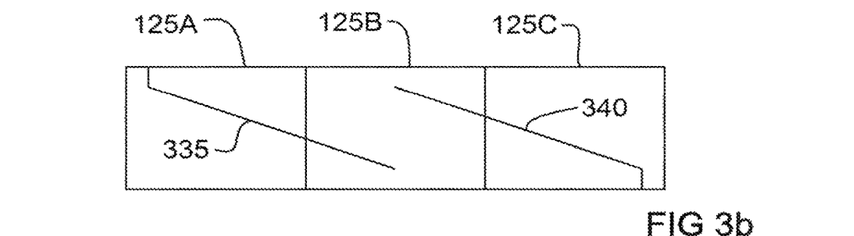
Figure 3C:
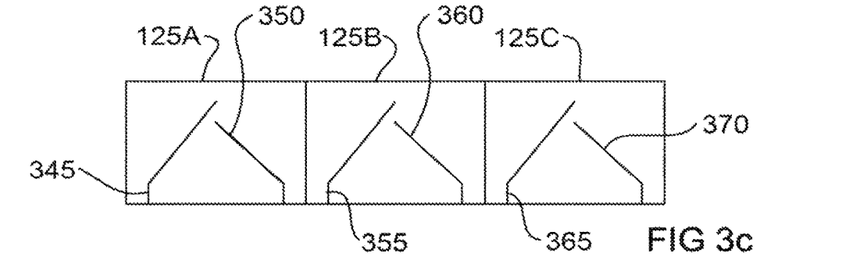
Figure 3D:
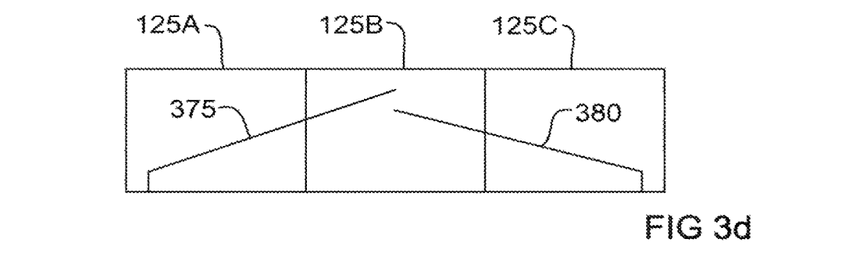
Figure 3E:
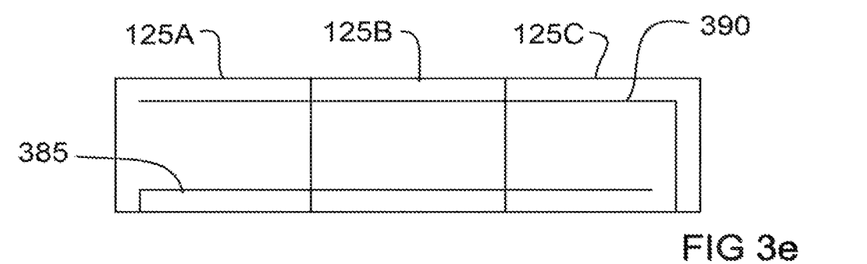
Figure 3F:
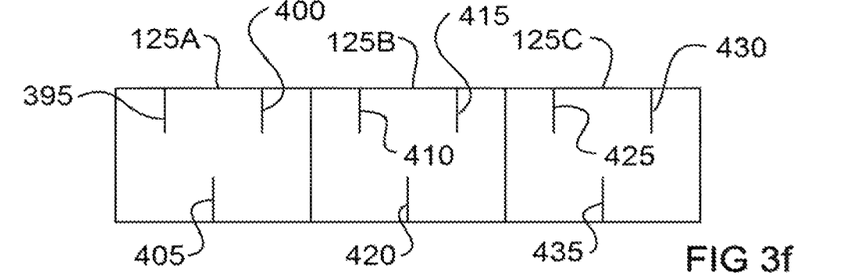
Figure 3G:
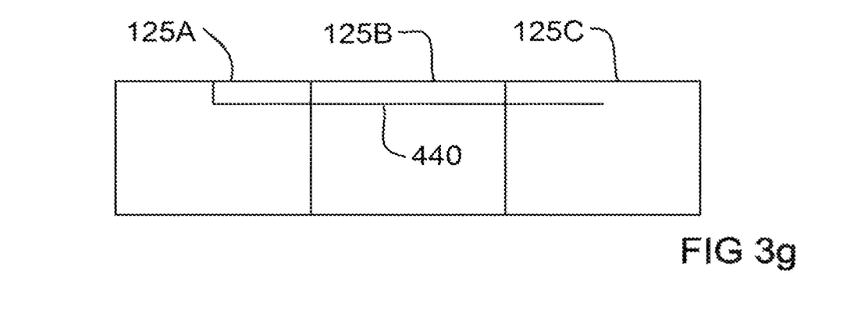

Further, it will be appreciated, as shown in FIG. 3G, that one ionization probe may be positioned in any arrangement extending across the surface area of two or more of the heat emitting elements 125A-125E. Advantageously, the use of one ionization probe allows, for example, heat emitting element 125A to extinguish, but provided that the ionization probe is still sensing a flame at another heat emitting element 125B, the gas supply will not be shut off. Advantageously, this results in the radiant gas heater remaining in operation even in windy conditions while maintaining safety. In a further advantage, the use of only one ionization probe across two or more heat emitting elements reduces the cost while still avoiding the gas supply being shut off unnecessarily.

Figure 2:
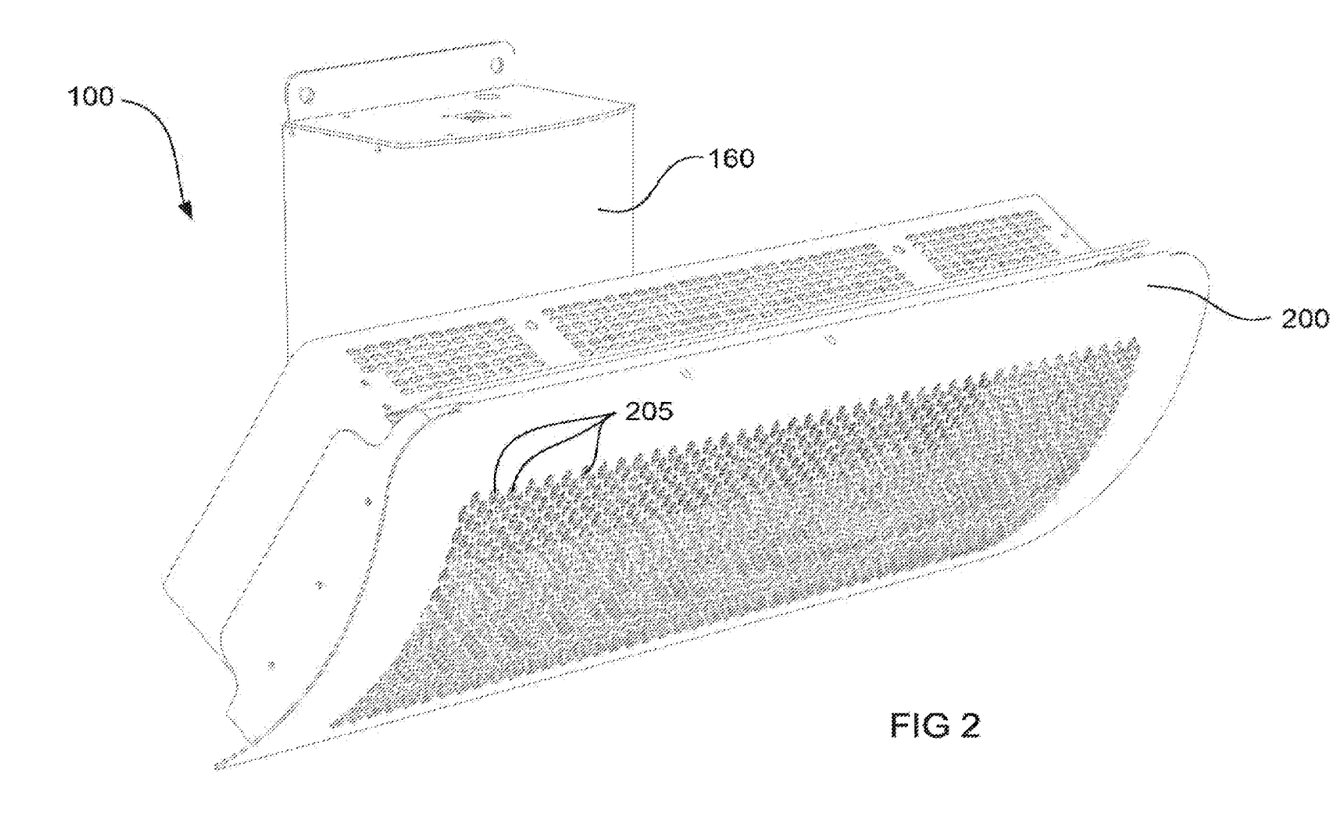
FIG. 2 is a front view of a cover for use with the radiant gas heater of FIGS. 1a and b.

FIG. 2 shows a cover 200 which may be placed over the housing 115. The cover 200 includes a plurality of apertures 205 each of which is preferably substantially circular in shape. The apertures may alternatively be square or oval. Apertures with a continuous edge (i.e. round or oval) have been found to perform best as a wind diffuser when receiving wind from a number of different directions onto the heat emitting elements (i.e. in different X and Y planes). Advantageously, the provision of a cover 200 over the housing 115 acts to further assist the radiant gas heater 100 from being susceptible to wind. The apertures 205 allow heat flow but also act to prevent wind from blowing out the burners 120A-E. The arrangement of the apertures 205 and in particular the surface area of the apertures compared with the total surface area of the cover 200 may provide a balance between heat flow and wind resistance.

Preferably the combined surface area of the plurality of apertures is between 45 to 55% of the total surface area of the cover. More preferably, the combined surface area of the plurality of apertures is 49 to 51% of the total surface area of the cover. The 45%-55% area also impacts the size and pattern of the apertures 205. The preferred size is approximately 7 mm-12 mm in diameter.

FIGS. 3A-F are schematic diagrams of possible arrangements of the two or more ionization probes according to the invention. FIG. 3G is a schematic diagram showing one of any number of possible arrangements where one ionization probe is positioned in any arrangement extending across the surface area of two or more of the heat emitting elements 125A-125E. FIG. 3A illustrates a radiant gas heater 100 having three heat emitting elements 125A, 125B and 125C. Each heat emitting element 125A, 125B and 125C has two ionization probes 305, 310; 315, 320; and 325, 330 to detect the presence or absence of a flame on heating elements 125A, 125B and 125C. In the event that ionization probe 305, 310; 315, 320; and 325, 330 detects an unstable condition on 125A, 125B and 125C then it will shut down burners associated with 125A, 125B and 125C via a control unit 150A. However, it may be that one (or even two) of heat emitting elements 125A, 125B and 125C have not been extinguished or are not in an unstable condition. This is determined by the ionization probes 305, 310; 315, 320; and 325,330. If ionization probe 305, 310; 315, 320; and 325,330 determines that there is no unstable condition, then the burners associated with heating elements 125A, 125B and 125C will not be shut down, since even if, for example burners associated with heat emitting element 125A, 125B are extinguished and leaking gas, heat emitting element 125C will be able to safely re-light heat emitting element 125B and 125A after a short period of time (due to their proximity). Advantageously, this results in the radiant gas heater 100 remaining in operation even in windy conditions while maintaining safety.

FIG. 3B illustrates a radiant gas heater 100 having three heat emitting elements 125A, 125B and 125C. Heat emitting element 125A and 125C has an ionization probe 335, 340. Ionization probe 335 extends across heat emitting elements 125A and 125B while ionization probe 340 extends across heat emitting elements 125C and 125B to detect the presence or absence of a flame.

FIG. 3C illustrates a radiant gas heater 100 having three heat emitting elements 125A, 125B and 125C. Each heat emitting element 125A, 125B and 125C has two ionization probes 345, 350; 355, 360; and 365, 370 positioned at an inclined angle to detect the presence or absence of a flame.

FIG. 3D illustrates a radiant gas heater 100 having three heat emitting elements 125A, 125B and 125C. Heat emitting elements 125A and 125C has an ionization probe 375, 380. Ionization probe 375 extends at an inclined angle across heat emitting elements 125A and 125B while ionization probe 340 extends at an inclined angle across heat emitting elements 125C and 125B to detect the presence or absence of a flame.

FIG. 3E illustrates a radiant gas heater 100 having three heat emitting elements 125A, 125B and 125C. Heat emitting element 125A and 125C has an ionization probe 385, 390. Ionization probe 385 extends across heat emitting elements 125A, 125B and 125C, while ionization probe 390 extends across heat emitting elements 125C, 125B and 125A to detect the presence or absence of a flame.

FIG. 3F illustrates a radiant gas heater 100 having three heat emitting elements 125A, 125B and 125C. Each heat emitting element 125A, 125B and 125C has three ionization probes 395, 400, 405; 410, 415, 420; and 425, 430, 435 to detect the presence or absence of a flame.

FIG. 3G illustrates a radiant gas heater 100 having three heat emitting elements 125A, 125B and 125C. Heat emitting element 125A has an ionization probe 440. Ionization probe 440 extends across heat emitting elements 125A, 125B and 125C to detect the presence or absence of a flame on heating elements 125A, 125B and 125C. In the event that ionization probe 440 detects an unstable condition on 125A, 125B and 125C then it will shut down burners associated with 125A, 125B and 125C via a control unit 150A. However, it may be that one (or even two) of heat emitting elements 125A, 125B and 125C have not been extinguished or are not in an unstable condition. This is determined by the ionization probe 440. If ionization probe 440 determines that there is no unstable condition, then the burners associated with heating elements 125A, 125B and 125C will not be shut down, since even if burners associated with heat emitting element 125A, 125B are extinguished and leaking gas, heat emitting element 125C will be able to safely re-light heat emitting element 125B and 125A after a short period of time (due to their proximity). Advantageously, this results in the radiant gas heater 100 remaining in operation even in windy conditions while maintaining safety.

Although the exemplary embodiments of the invention have been disclosed for illustrative purposes, those skilled in the art will appreciate that various modifications, additions and substitutions are possible without departing from the scope of the present invention. Therefore, the present invention is not limited to the above-described embodiments but is defined by the following claims.

The invention claimed is:

1. A radiant gas heater including:
one or more gas inlets, for receiving gas from a gas supply;
one or more air inlets;
one or more gas burners, in which gas from the one or more gas inlets is burned using oxygen admitted through the one or more air inlets;
a plurality of heat emitting elements, which emit infrared radiation using energy generated by the one or more gas burners, each of the plurality of heat emitting elements in direct communication with the one or more gas burners;
two ionization probes each proximal, respectively, to at least two corresponding heat emitting elements of the plurality of heat emitting elements for detecting the presence or absence of a flame relative to each of the at least two corresponding heat emitting elements, respectively, wherein each ionization probe extends across surfaces of the at least two corresponding heat emitting elements, respectively, wherein each ionization probe extends across a surface of a heat emitting element that the other ionization probe does not extend across;
a housing, which accommodates the one or more gas burners, the plurality of heat emitting elements and the two ionization probes; and
one or more control units in electrical communication with the two ionization probes and the one or more gas inlets, the one or more control units operable to shut off the gas supply if the two ionization probes detect the absence of a flame such that if a flame is present on at least one of the plurality of heat emitting elements, the gas will not be shut off and the plurality of heat emitting elements will continue to emit infrared radiation using energy generated by the one or more gas burners.

2. The radiant gas heater of claim 1, wherein the one or more control units are operable to maintain the gas supply if at least one of the two ionization probes detects the presence of a flame on at least one of the plurality of heat emitting elements.

3. The radiant gas heater of claim 1, wherein the one or more control units are operable to shut off the gas supply if the two ionization probes detect the absence of a flame on each of the plurality of heat emitting elements.

4. The radiant gas heater of claim 1, wherein the heat emitting elements are selected from a group including ceramic tiles, compressed metal mesh and metal foam.

5. The radiant gas heater of claim 1, further including one or more spacer elements positioned between the two ionization probes and the surfaces of the respective at least two corresponding heat emitting elements.

6. The radiant gas heater of claim 5, wherein the one or more spacer elements are made of a non-conducting material.

7. The radiant gas heater of claim 1 wherein the two ionization probes further include a mount attached to one end of each of the two ionization probes for mounting to the one or more control units.

8. The radiant gas heater of claim 7, wherein the mount is made of a non-conducting material.

9. The radiant gas heater of claim 1, further including a cover attachable to the housing, wherein the cover is formed from ceramic glass.

10. The radiant gas heater of claim 1, further including a cover attachable to the housing, the cover including a plurality of apertures through which infrared radiation is directed.

11. The radiant gas heater of claim 10, wherein a combined surface area of the plurality of apertures is between 45 to 55% of a total surface area of the cover.

12. The radiant gas heater claim 10, wherein a combined surface area of the plurality of apertures is 49 to 51% of a total surface area of the cover.

13. The radiant gas heater of claim 1, wherein the radiant gas heater is a wind resistant outdoor heater.

14. The radiant gas heater of claim 1, wherein a first ionization probe extends across a surface of a heat emitting element positioned at a first end of the radiant gas heater, and a second ionization probe extends across a surface of a heating element positioned at a second end of the radiant gas heater.

15. The radiant gas heater of claim 1, further including a first ionization probe extending across the surfaces of the respective at least two corresponding heat emitting elements and disposed at an inclined angle, and a second ionization probe also extending across the surfaces of the respective at least two corresponding heat emitting elements and disposed at an inclined angle, both probes proximal to the respective at least two corresponding heat emitting elements for detecting the presence or absence of a flame relative to each of the respective at least two more corresponding heat emitting elements.

* * * * *